US009958592B2

United States Patent
Fujita et al.

(10) Patent No.: US 9,958,592 B2
(45) Date of Patent: May 1, 2018

(54) DISPLAY DEVICE AND GAME MACHINE

(71) Applicant: OMRON Corporation, Kyoto-shi, Kyoto (JP)

(72) Inventors: Junya Fujita, Aichi (JP); Jun Kishimoto, Gifu (JP); Yuji Hirose, Kyoto (JP)

(73) Assignee: OMRON Corporation, Kyoto (JP)

( * ) Notice: Subject to any disclaimer, the term of this patent is extended or adjusted under 35 U.S.C. 154(b) by 1 day.

(21) Appl. No.: 15/130,594

(22) Filed: Apr. 15, 2016

(65) Prior Publication Data

US 2016/0306097 A1    Oct. 20, 2016

(30) Foreign Application Priority Data

Apr. 15, 2015 (JP) ................... 2015-083637

(51) Int. Cl.
| | |
|---|---|
| *F21V 7/04* | (2006.01) |
| *F21V 8/00* | (2006.01) |
| *G09G 3/00* | (2006.01) |
| *A63F 7/02* | (2006.01) |
| *G09G 3/34* | (2006.01) |
| *G09G 3/36* | (2006.01) |
| *A63F 9/24* | (2006.01) |

(52) U.S. Cl.
CPC ............ *G02B 6/0036* (2013.01); *A63F 7/022* (2013.01); *G02B 6/0015* (2013.01); *G02B 6/0068* (2013.01); *G09G 3/003* (2013.01); *A63F 2009/2451* (2013.01); *A63F 2009/2457* (2013.01); *G09G 3/342* (2013.01); *G09G 3/3611* (2013.01); *G09G 2300/023* (2013.01)

(58) Field of Classification Search
CPC .. G02B 6/0036; G02B 6/0015; G02B 6/0068; A63F 7/022; G09G 3/003
USPC .......................................................... 362/606
See application file for complete search history.

(56) References Cited

U.S. PATENT DOCUMENTS

| | | | | |
|---|---|---|---|---|
| 6,648,486 B2 * | 11/2003 | Harbers | ............... | G02B 6/0036 362/613 |
| 6,871,975 B2 * | 3/2005 | Chuang | ............... | G02B 6/0046 362/23.1 |
| 7,403,243 B2 * | 7/2008 | Fukuyoshi | ........ | G02F 1/133308 349/58 |

(Continued)

FOREIGN PATENT DOCUMENTS

JP      2007-097799 A      4/2007

*Primary Examiner* — Bryon T Gyllstrom
(74) *Attorney, Agent, or Firm* — Osha Liang LLP

(57) ABSTRACT

A display device has a first display panel including an image display area in which an image is displayable, a light guide plate arranged at a back of the first display panel, the light guide plate comprising a transparent material, a plurality of light sources respectively facing a plurality of positions on side surfaces of the light guide plate, a second display panel arranged at a back of the light guide plate, the second display panel being configured to display an image viewable through the light guide plate and the first display panel, and a controller configured to control turning on and turning off of the plurality of light sources and to control a first image displayed on the first display panel and a second image displayed on the second display panel. The light guide plate includes an emission surface facing the first display panel.

7 Claims, 8 Drawing Sheets

(56) References Cited

U.S. PATENT DOCUMENTS

| | | | | |
|---|---|---|---|---|
| 8,434,685 B1* | 5/2013 | Lewbel | ............... | G06F 3/1423 235/454 |
| 8,714,802 B2* | 5/2014 | Chen | ............... | G02B 6/006 362/606 |
| 2002/0163791 A1* | 11/2002 | Hoelen | ............... | G02B 6/0076 362/616 |
| 2003/0063456 A1* | 4/2003 | Katahira | ............... | G02B 6/0046 362/23.16 |
| 2004/0114396 A1* | 6/2004 | Kobayashi | ............... | G02F 1/1336 362/561 |
| 2004/0135936 A1* | 7/2004 | Lee | ............... | G02B 6/0043 349/64 |
| 2005/0135115 A1* | 6/2005 | Lamb | ............... | G02B 6/0076 362/613 |
| 2006/0181897 A1* | 8/2006 | Ueno | ............... | G02B 6/0036 362/600 |
| 2008/0284945 A1* | 11/2008 | Schultz | ............... | G02B 6/0016 349/65 |
| 2015/0235508 A1* | 8/2015 | Shinohara | ............... | G07F 17/3211 463/31 |

* cited by examiner

DISPLAY DEVICE AND GAME MACHINE

BACKGROUND

Field

The present invention relates to a display device that displays a plurality of images superimposed on one another, and to a game machine including such a display device.

Related Art

To enhance visual effects, display devices may have a plurality of layered display areas stacked on top of another to switch letters, patterns, or designs appearing in selected display areas (refer to, for example, Patent Literature 1).

For example, a decorative display device described in Patent Literature 1 includes a first display plate and a second display plate, which are light guide plates with designs for diffusing light, a support, which supports the first display plate and the second display plate in a removable manner, a first light source and a second light source, which are mounted on the support to illuminate an end face of the first display plate and an end face of the second display plate, and a controller for controlling the lighting patterns of the first light source and the second light source. The first display plate is arranged in front of the second display plate. The first display plate and the second display plate partially or entirely overlap with each other to form a predetermined image pattern.

CITATION LIST

Patent Literature

Patent Literature 1: Japanese Unexamined Patent Application Publication No. 2007-97799

SUMMARY

However, the decorative display device described in Patent Literature 1 has its patterns predefined on the two display plates, and cannot dynamically change the area in which the patterns overlap with each other. The demand is increasing for display devices that can dynamically change an area in which a plurality of images overlap.

One or more aspects of the present invention are directed to a display device that can dynamically change an area in which a plurality of images overlap.

One aspect of the invention provides a display device including a first display panel, a light guide plate, a plurality of light sources, a second display panel, and a controller. The first display panel includes an image display area in which an image is displayable. The light guide plate is arranged at a back of the first display panel. The light guide plate is formed from a transparent material. The plurality of light sources respectively face a plurality of positions on side surfaces of the light guide plate. The second display panel is arranged at a back of the light guide plate. The second display panel displays an image viewable through the light guide plate and the first display panel. The controller controls turning on and turning off of the plurality of light sources and controls a first image displayed on the first display panel and a second image displayed on the second display panel. The light guide plate includes an emission surface facing the first display panel, a diffusion surface facing the second display panel, and a plurality of prisms respectively arranged in a plurality of partial areas of the diffusion surface respectively corresponding to the plurality of light sources. Each of the plurality of prisms illuminates a portion of the image display area of the first display panel corresponding to the corresponding one of the partial areas with light emitted from the corresponding one of the light sources and entering the light guide plate.

In this display device, the plurality of partial areas may be set to allow the entire display image area of the first display panel image display area to be illuminated with light from the plurality of light sources when all the plurality of light sources are turned on.

Another aspect of the invention provides a game machine. The game machine includes a game machine unit, and a display device arranged on a surface of the game machine unit to face a player of the game machine. The display device may be any display device described above.

The display device according to one or more embodiments of the present invention can dynamically change an area in which a plurality of images overlap.

DETAILED DESCRIPTION

A display device according to embodiments of the present invention will now be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. The display device includes two display panels stacked on top of another to display images. The display device includes a light guide plate between the two display panels. The light guide plate illuminates different areas of the front display panel in accordance with the light sources to be turned on selectively from a plurality of light sources. The display device can change an area in which images displayed on the two display panels overlap with each other, and can also change an area in which an image displayed on the front display panel is enhanced.

For ease of explanation, the side of the display device facing the viewer refers to the front, and its opposite refers to the back.

Figure 1:
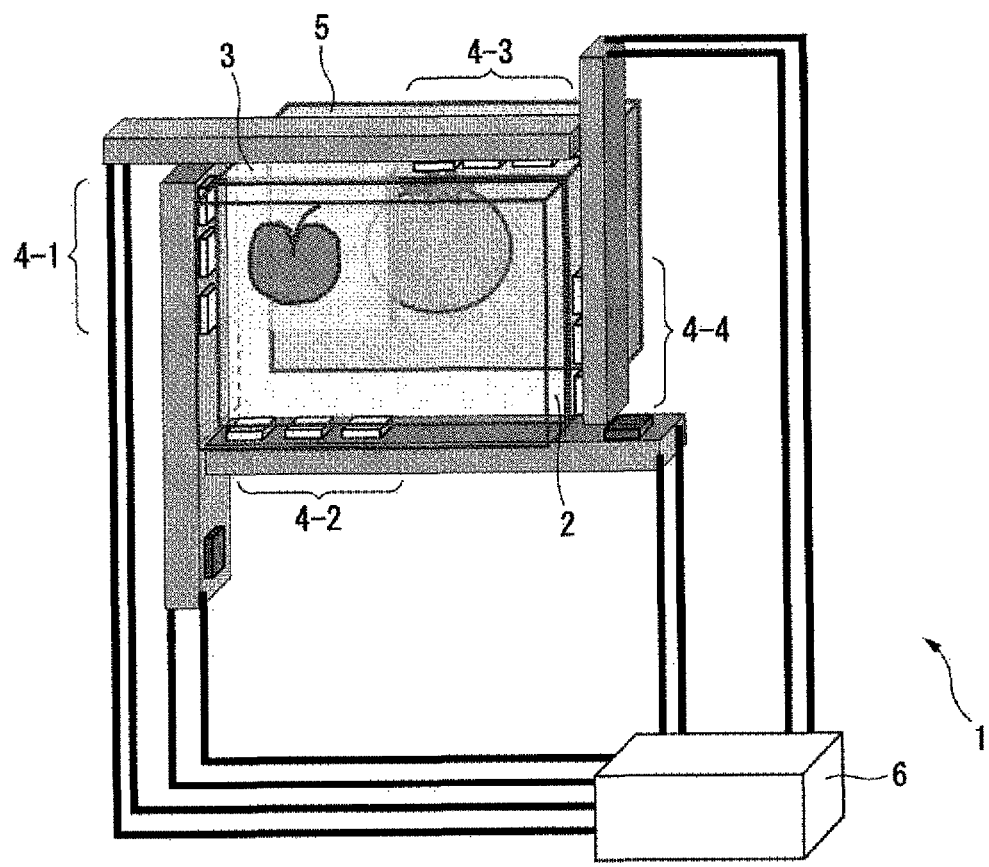
FIG. 1 is a schematic diagram showing a display device according to one embodiment of the present invention.

FIG. 1 is a schematic diagram showing a display device according to one embodiment of the present invention. A display device 1 includes a first liquid crystal panel 2, a light guide plate 3, four light sources 4-1 to 4-4, a second liquid crystal panel 5, and a controller 6. The first liquid crystal panel 2, the light guide plate 3, and the second liquid crystal panel 5 are arranged in the stated order from the front toward the back. The first light sources 4-1 to 4-4 are arranged to face incident surfaces formed on different side walls of the light guide plate 3.

The first liquid crystal panel 2 is an example of a display panel. The first liquid crystal panel 2 includes a display area for displaying an image, and displays an image in the display area in accordance with an image signal provided from the controller 6. For example, the first liquid crystal panel 2 includes a liquid crystal layer containing liquid crystal molecules, two transparent electrodes formed from, for example, indium tin oxide (ITO), which are arranged to face each other across the liquid crystal layer, two transparent substrates formed from glass or transparent resin, which are arranged to face each other across the liquid crystal layer and the transparent electrodes, and two polarizing plates, which are arranged to face each other across the liquid crystal layer, the transparent electrodes, and the transparent substrates. The first liquid crystal panel 2 may further include alignment membranes between the liquid crystal layer and the transparent electrodes for aligning the liquid crystal molecules. One of the transparent electrodes is formed in a matrix to allow voltage to be applied in units of pixels in accordance with an image signal. To display a color image, the first liquid crystal panel 2 may further include color filters arranged in a predetermined pattern in units of pixels between one of the transparent electrodes and its transparent substrate.

The two alignment membranes may align the liquid crystal molecules in the liquid crystal layer in a predetermined direction. To align, for example, the crystal molecules in a twisted nematic configuration in the liquid crystal layer, the two alignment membranes are arranged to have their alignment directions orthogonal to each other. The two polarizing plates pass polarizing components having polarization planes in specific directions. For example, the two polarizing plates are arranged to have their transmission axes orthogonal to each other to allow the liquid crystal panel 2 to operate in a normally white (NW) mode. When no electrical field is applied between the two transparent electrodes having the liquid crystal layer sandwiched between them, or in other words no image signal is input, the polarizing direction of the light that has passed through the polarizing plate at the back rotates by 90 degrees at the liquid crystal layer. As a result, the light can pass through the polarizing plate arranged at the front. In this state, the first liquid crystal panel 2 is transparent. When an electrical field in accordance with an image signal is applied between the two transparent electrodes having the liquid crystal layer sandwiched between them, the liquid crystal molecules in the liquid crystal layer are aligned in a direction nearer the direction parallel to the direction of the electrical field. As a result, the polarization plane of the light that passes through the liquid crystal layer rotates by a smaller degree in accordance with the strength of the electrical field. As a larger voltage is applied in accordance with an image signal, or in other words as a more white image is displayed, a smaller portion of the light that has passed through the polarizing plate arranged at the back passes through the polarizing plate arranged at the front. In this state, the first liquid crystal panel 2 is more opaque.

The polarizing plates may be arranged to have their transmission axes parallel to each other to allow the first liquid crystal panel 2 to operate in a normally black (NB) mode. When an electrical field is applied between the two transparent electrodes having the liquid crystal layer sandwiched between them, the first liquid crystal panel 2 becomes transparent. When no electrical field is applied between the two transparent electrodes having the liquid crystal layer sandwiched between them, the first liquid crystal panel 2 becomes opaque.

The first liquid crystal panel 2 may not be a liquid crystal panel with the structure described above. The first liquid crystal panel 2 may be any display panel that can display an image in accordance with an image signal provided from the controller 6 and can change the degree of transparency in accordance with the applied voltage.

The light guide plate 3 illuminates the first liquid crystal panel 2 from the backside with light emitted from each of the light sources 4-1 to 4-4. The light guide plate 3 passes light representing the image displayed by the second liquid crystal panel 5 arranged at the back of the light guide plate 3 toward the liquid crystal panel 2. To allow this, the light guide plate 3 is a sheet member with an area larger than the display area of the first liquid crystal panel 2. The light guide plate 3 is arranged to face the back surface of the first liquid crystal panel 2. The light guide plate 3 is prepared by molding of a resin transparent to visible light, such as polymethyl methacrylate (PMMA), polycarbonate, or cycloorefin polymer.

Figure 2:
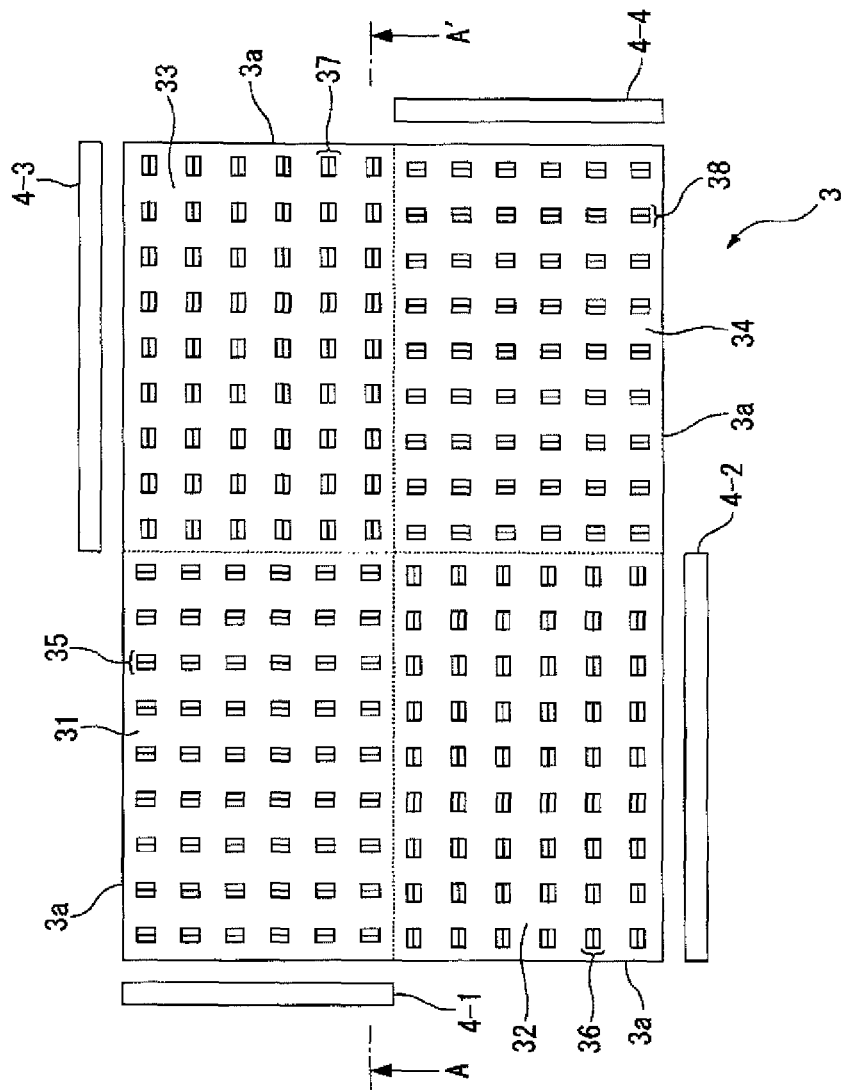
FIG. 2 is a schematic front view of a light guide plate.
Figure 3:
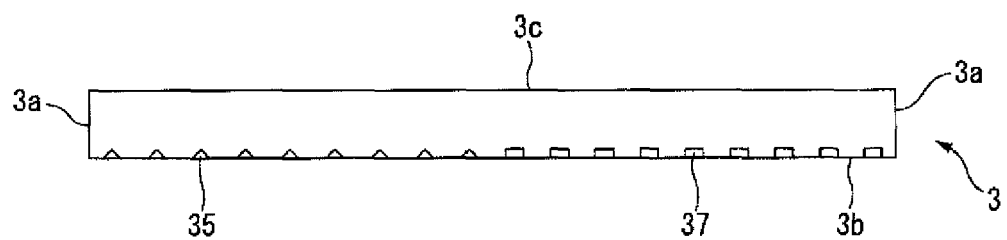
FIG. 3 is a schematic sectional side view of the light guide plate taken along line A-A' in FIG. 2.

FIG. 2 is a schematic front view of the light guide plate 3. FIG. 3 is a schematic sectional side view of the light guide plate 3 taken along line A-A' in FIG. 2. As shown in FIG. 2, each side wall of the light guide plate 3 functions as an incident surface 3a facing one of the light sources 4-1 to 4-4. The incident surface 3a may be a convex surface toward each light source to function as a collimating lens, which will enhance the directivity of incident light from the light sources 4-1 to 4-4.

The light guide plate 3 has a diffusion surface 3b at its back. The diffusion surface 3b has an area overlapping with the display area of the first liquid crystal panel 2 as viewed from the front. The area of the diffusion surface 3b overlapping with the display area is split into two in the horizontal direction and into two in the vertical direction to form four partial areas 31 to 34. In each of the partial areas 31 to 34, a plurality of prisms each having a reflective surface facing one of the light sources 4-1 to 4-4 corresponding to the partial area are arranged in a lattice with a predetermined pitch. The prisms may be arranged, for example, in a zigzag. Each prism reflects light from the light source entering the light guide plate 3 through the incident surface 3a toward an emission surface 3c located opposite to the diffusion surface 3b and facing the back surface of the first liquid crystal panel 2. As a result, the light is emitted from the emission surface 3c at a substantially right angle to illuminate a partial area in the display area of the first liquid crystal panel 2 corresponding to the partial area in which each prism is arranged.

Among these prisms, a plurality of prisms 35 arranged in the partial area 31 located on the upper left as viewed from the front reflect light from the light source 4-1 entering the light guide plate 3 through the incident surface 3a to illuminate the upper left partial area in the display area of the first liquid crystal panel 2. A plurality of prisms 36 arranged in the partial area 32 located on the lower left as viewed from the front reflect light from the light source 4-2 entering the light guide plate 3 through the incident surface 3a to illuminate the lower left partial area in the display area of the first liquid crystal panel 2. In the same manner, a plurality of prisms 37 arranged in the partial area 33 located on the upper right as viewed from the front reflect light from the light source 4-3 entering the light guide plate 3 through the incident surface 3a to illuminate the upper right partial area in the display area of the first liquid crystal panel 2. A plurality of prisms 38 arranged in the partial area 34 located on the lower right as viewed from the front reflect light from the light source 4-4 entering the light guide plate 3 through the incident surface 3a to illuminate the lower right partial area in the display area of the first liquid crystal panel 2.

In FIGS. 2 and 3, the sizes of the prisms 35 to 38 and the thickness of the light guide plate 3 are exaggerated for purposes of illustration.

For example, each of the prisms 35 to 38 is a substantially triangular groove with a predetermined length on the diffusion surface 3b. Each of the reflective surfaces of the prisms 35 to 38 forms a predetermined angle with the diffusion surface 3b. The predetermined angle is set at an angle that allows total reflection of the light from the light source entering the light guide plate 3 toward the emission surface 3c. For example, the predetermined angle is in a range of 40 to 50 degrees with respect to the diffusion surface 3b. The predetermined length is set, for example, in a range of about 100 micrometers to a few millimeters.

The prisms 35 to 38 may be formed to fall within the upper limit of the layout density, which is the ratio of the area occupied by the prism 35, 36, 37 or 38 to the area of the diffusion surface 3b. More specifically, the prisms 35 to 38 may have the layout density set to allow an image displayed on the second liquid crystal panel 5 arranged at the back of the light guide plate 3 to be viewable by the viewer as if the image is being viewed through a transparent member or through an empty space when the liquid crystal panel 2 is transparent and the light sources 4-1 to 4-4 are turned off. For example, the prisms 35 to 38 may all have a layout density of 30.0% or less.

In some embodiments, the prisms 35 to 38 may be formed to fall within the upper limit of the haze value, which is the ratio of the diffusion light to the total transmission light. More specifically, the prisms 35 to 38 may have the haze value set to allow an image displayed on the second liquid crystal panel 5 arranged at the back of the light guide plate 3 to be viewable by the viewer as if the image is being viewed through a transparent member or through an empty space when the liquid crystal panel 2 becomes transparent. For example, the prisms 35 to 38 may all have a haze value of 28% or less.

Each of the light sources 4-1 to 4-4 includes an emitter element, such as a white light emitting diode or a fluorescent lamp, with its light emitting surface facing the incident surface 3a of the light guide plate 3. For example, each of the light sources 4-1 to 4-4 is arranged to have the direction with the highest intensity of light orthogonal to the incident surface 3a.

In the present embodiment, the light source 4-1 is arranged for the upper half portion of the light guide plate 3 to face the left incident surface of the light guide plate 3 as viewed from the front. As a result, the light source 4-1 corresponds to the partial area 31. The light source 4-2 is arranged for the left half portion of the light guide plate 3 to face the lower incident surface of the light guide plate 3 as viewed from the front. As a result, the light source 4-2 corresponds to the partial area 32. In the same manner, the light source 4-3 is arranged for the right half portion of the light guide plate 3 to face the upper incident surface of the light guide plate 3 as viewed from the front. As a result, the light source 4-3 corresponds the partial area 33. The light source 4-4 is arranged for the lower half portion of the light guide plate 3 to face the right incident surface of the light guide plate 3 as viewed from the front. As a result, the light source 4-4 corresponds to the partial area 34.

The light sources 4-1 to 4-4 may each include a plurality of emitter elements. In this case, the plurality of emitter elements included in each light source are aligned in the longitudinal direction of the incident surface 3a facing each light source across the entire width of the partial area corresponding to each light source. The light sources 4-1 to 4-4 are turned on or off in accordance with control signals provided from the controller 6.

The second liquid crystal panel 5 is an example of a second display panel. The second liquid crystal panel 5 is arranged at the back of the light guide plate 3 to have its display surface facing the diffusion surface 3b of the light guide plate 3. The second liquid crystal panel 5 displays an image in accordance with an image signal provided from the controller 6. The second liquid crystal panel 5 may be any liquid crystal panel with a backlight that can display an image in accordance with an image signal provided from the controller 6.

For example, the controller 6 includes a processor, a memory circuit, a drive circuit for the first liquid crystal panel 2, and a drive circuit for the second liquid crystal panel 5. The controller 6 controls whether to display an image on the first liquid crystal panel 2 and on the second liquid crystal panel 5, and controls images to be displayed on these panels in accordance with a control signal provided from its host controller (not shown). The controller 6 turns on and off the light sources 4-1 to 4-4, or adjusts the amount of light to be emitted when turning on the light sources 4-1 to 4-4. For example, the controller 6 adjusts the amount of light emitted from the light sources 4-1 to 4-4 by pulse-width modulation (PWM).

The controller 6 switches an area in which images are superimposed on each other and an area in which an image displayed on the front display panel is enhanced in various manners by controlling an image to appear on the first liquid crystal panel 2 and an image to appear on the second liquid crystal panel 5, and turning on and off the light sources 4-1 to 4-4.

Figure 4A:
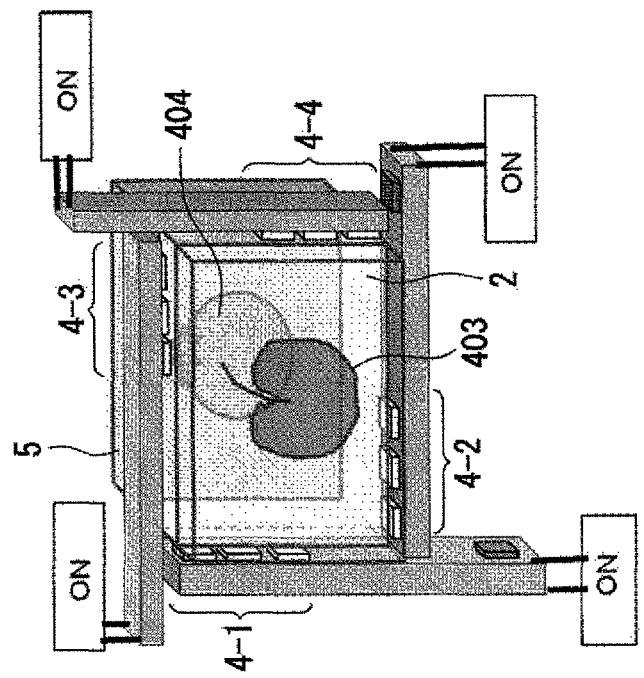
FIGS. 4A and 4B are diagrams each showing the display states of a first liquid crystal panel and a second liquid crystal panel either displaying an image or displaying no image, the combinations of the on or off states of light sources, and the resultant display content viewable by a viewer in one example.
Figure 4B:
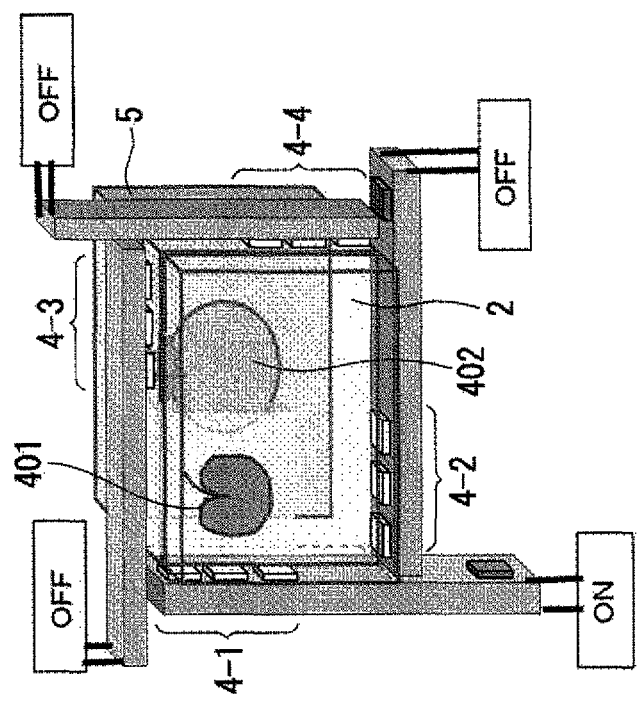

FIGS. 4A and 4B are diagrams each showing the display states of the first liquid crystal panel 2 and the second liquid crystal panel 5 each displaying an image, the combinations of the on or off states of the light sources 4-1 to 4-4, and the resultant display content viewable by a viewer in one example.

In the example shown in FIG. 4A, the light source 4-1 is turned on selectively from the light sources 4-1 to 4-4.

In this case, light emitted from the light source 4-1 illuminates only the upper left partial area in the display area of the first liquid crystal panel 2. The viewer can view an image 401 appearing in the upper left partial area of the first liquid crystal panel 2. With no other areas in the display area of the first liquid crystal panel 2 being illuminated, the image appearing in the display area and an image 402 appearing on the second liquid crystal panel 5 are viewable in a manner superimposed on each other. In this case, the visibility of the image appearing on the second liquid crystal panel 5 changes depending on the transmittance determined by the image appearing on the first liquid crystal panel 2. More specifically, the visibility of the image appearing on the second liquid crystal panel 5 is higher as the transmittance of the first liquid crystal panel 2 is higher. For example, as the image appearing in the unilluminated areas of the first liquid crystal panel 2 is darker, the viewer can more easily view the image appearing on the second liquid crystal panel 5 through this display area. Thus, when the controller 6 controls a uniformly black image to appear in the unilluminated display areas of the first liquid crystal panel 2, the display device 1 can display the image appearing in the unilluminated areas of the second liquid crystal panel 5 and the image appearing in the illuminated partial display area of the first liquid crystal panel 2 in a manner superimposed on each other.

In the example shown in FIG. 4B, the light sources 4-1 to 4-4 are all turned on. In this case, the viewer can view an image 403 appearing in the entire display area of the first liquid crystal panel 2, whereas an image 404 appearing on the second liquid crystal panel 5 is blocked by light from the light sources and by the image 403 and is difficult to view.

As described above, the display device can switch its light sources to emit light to switch the area in which an image on the front liquid crystal panel can be viewed easily and the area in which images on the two liquid crystal panels are viewed in a manner superimposed on each other. This display device enables various displays, and enhances visual effects.

In a modification, the partial areas of the light guide plate 3 may overlap with each other.

Figure 5:
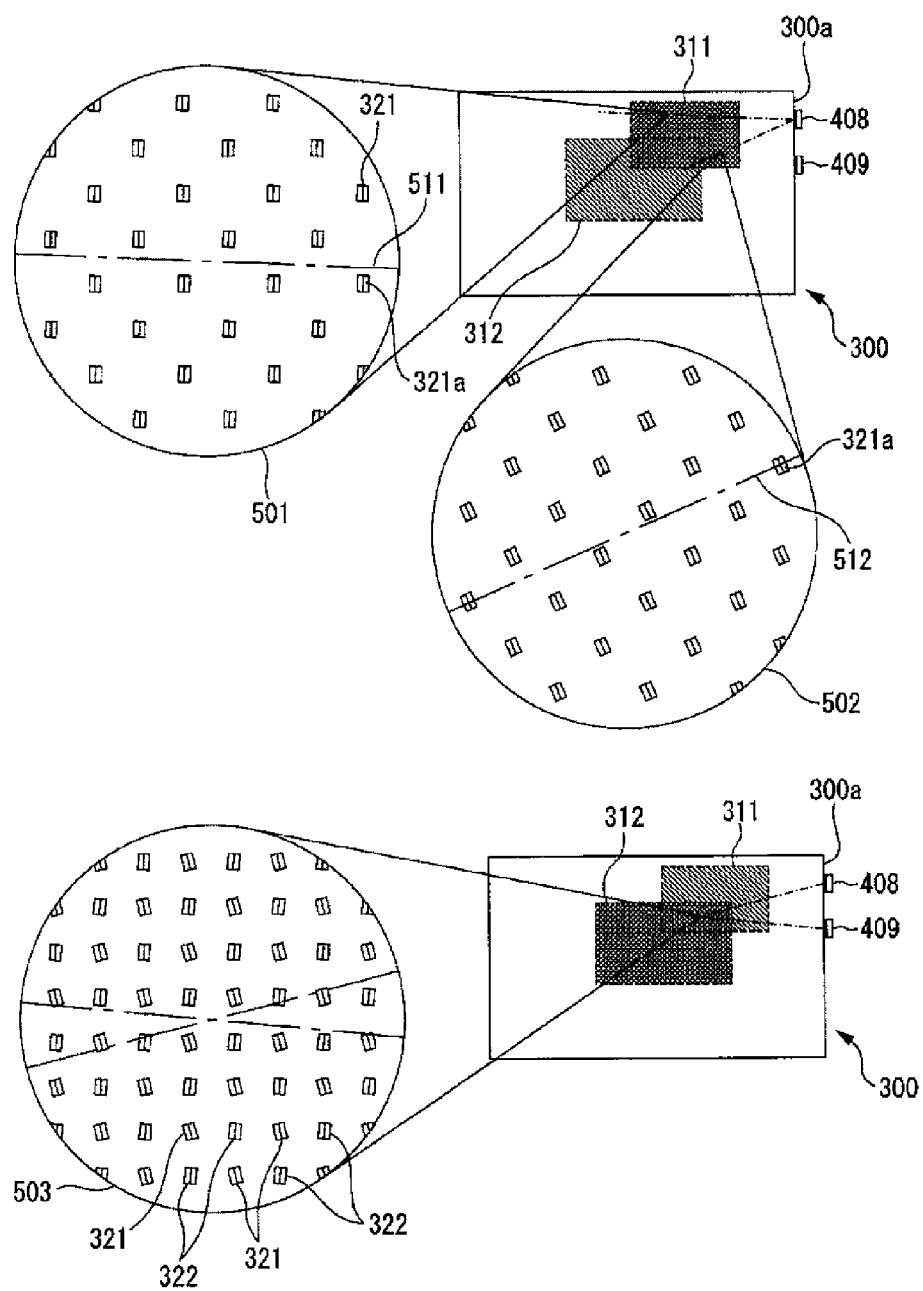
FIG. 5 is a schematic front view of a light guide plate showing the arrangement of the light guide plate and the light sources according to a modification.

FIG. 5 is a schematic front view of a light guide plate showing the arrangement of the light guide plate and the light sources according to this modification. In this modification, a light guide plate 300 has two partial areas 311 and 312. Two light sources 408 and 409 are aligned in the longitudinal direction of an incident surface 300a on one side wall of the light guide plate 300 to face the incident surface 300a. The light source 408 corresponds to the partial area 311. The light source 409 corresponds to the partial area 312.

A plurality of prisms 321 are arranged in a zigzag with a predetermined pitch in the partial area 311 of the diffusion surface at the back of a light guide plate 301. Each prism 321 illuminates a portion of the display area of the first liquid crystal panel 2 overlapping with the partial area 311 as viewed from the front with light from the light source 408 entering the light guide plate 300 through the incident surface 300a. To allow this, each prism 321 is arranged to have its reflective surface facing the light source 408. As shown in an enlarged partial view 501 and an enlarged partial view 502 of FIG. 5, each prism 321 has its reflective surface 321a orthogonal to a straight line 511 or 512 indicating the direction in which light is emitted from the light source 408 on a plane parallel to the diffusion surface.

In the same manner, a plurality of prisms 322 are arranged in a zigzag with a predetermined pitch in the partial area 312 of the diffusion surface of the light guide plate 300. Each prism 322 illuminates a portion of the display area of the first liquid crystal panel 2 overlapping with the partial area 312 as viewed from the front with light from the light source 409 entering the light guide plate 300 through the incident surface 300a. To allow this, each prism 322 is arranged to have its reflective surface facing the light source 409. As shown in an enlarged partial view 503 of FIG. 5, the prisms 321 and the prisms 322 are arranged alternately in the portion of the partial area 311 overlapping with the partial area 312.

In another modification, the display area of the first liquid crystal panel 2 may include a plurality of partial areas to continuously change the area illuminated with light from the light source passing through the light guide plate.

Figure 6:
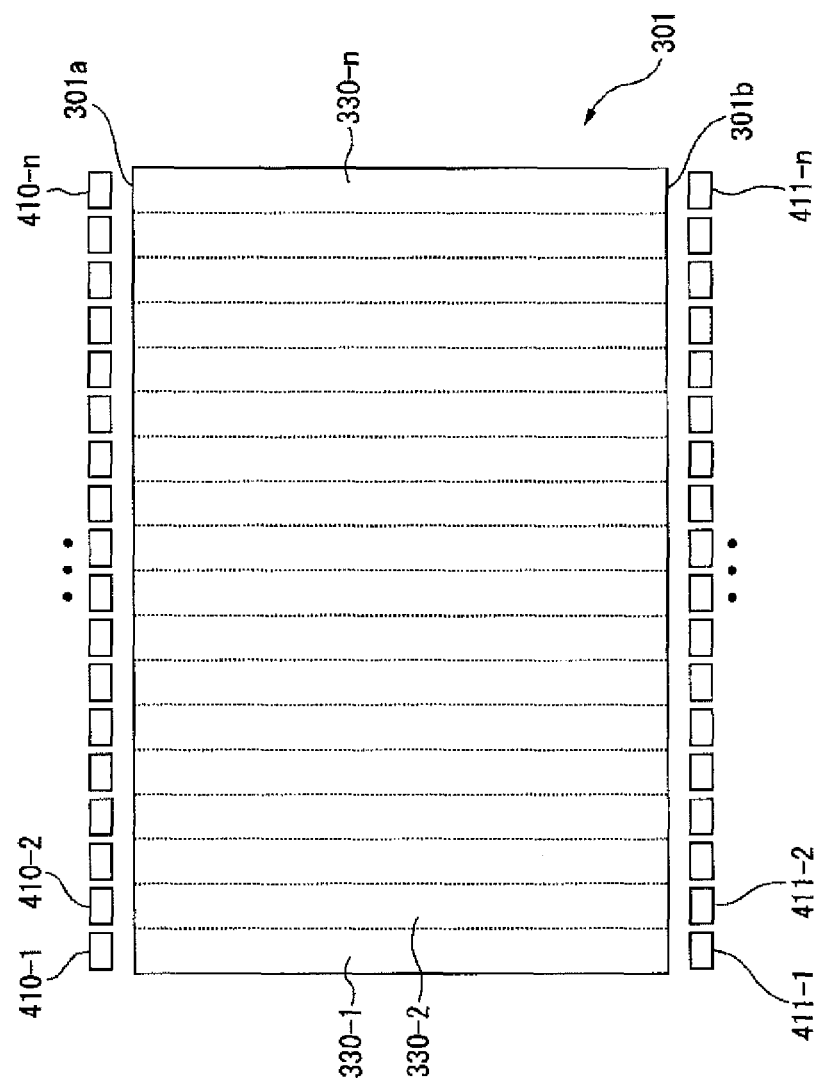
FIG. 6 is a schematic front view of a light guide plate showing the arrangement of the light guide plate and the light sources according to another modification.

FIG. 6 is a schematic front view of a light guide plate showing the arrangement of the light guide plate and the light sources according to this modification. In this modification, a plurality of light sources 410-1 to 410-$n$ (where n is an integer of at least 2) are aligned in a line on an incident surface 301a on the upper side wall of the light guide plate 301, and a plurality of light sources 411-1 to 411-$n$ are aligned in a line on an incident surface 301b on the lower side wall of the light guide plate 301. The light guide plate 301 includes a plurality of partial areas 330-1 to 330-$n$, which are aligned horizontally. The partial areas 330-1 to 330-$n$ correspond to the respective light sources arranged above and below these partial areas. More specifically, a partial area 330-$m$ (where $1 \leq m \leq n$) corresponds to a light source 410-$m$ and a light source 411-$m$. In the same manner as in the above embodiments or modifications, a plurality of prisms (not shown) are arranged for each of the partial areas 330-1 to 330-$n$ on the diffusion surface at the back of the light guide plate 301 to have their reflective surfaces facing the light sources corresponding to the partial areas. The prisms are arranged in a lattice or in a zigzag with a predetermined pitch.

At time t1, for example, the controller in this modification turns on light sources corresponding to a plurality of partial areas arranged continuous to each other, selectively from the light sources 410-1 to 410-$n$ and the light sources 411-1 to 411-$n$ corresponding to a plurality of partial areas arranged continuous to each other, and turns off the other light sources. At time t2, the controller turns off a predetermined number of light sources from either the rightmost light source or the leftmost light source selectively from the light sources that have been turned on, and then newly turns on a predetermined number of light sources continuous to each other toward the other side. The controller repeats this control to allow the viewer to view the illuminating area of the first liquid crystal panel 2 as if the illuminating area is shifting continuously.

Figure 7:
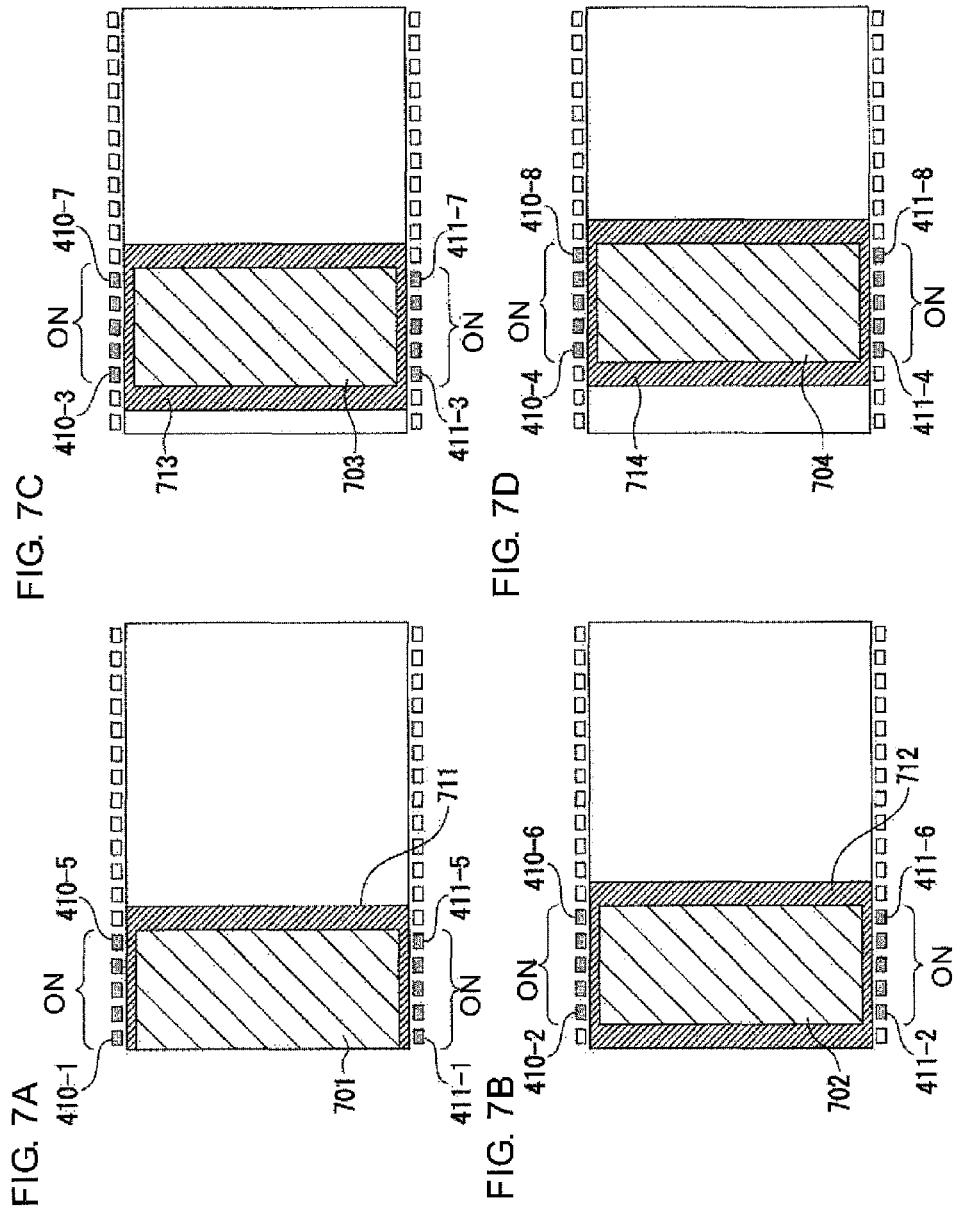
FIGS. 7A to 7D are diagrams showing the relationship between the light sources to be turned on and the areas to be illuminated in the first liquid crystal panel according to this modification.

FIGS. 7A to 7D are diagrams showing the relationship between the light sources to be turned on and the areas to be illuminated in the first liquid crystal panel 2 according to this modification. In FIG. 7A, the five light sources 410-1 to 410-5 and 411-1 to 411-5 from the left are turned on, whereas the other light sources are turned off. This illuminates an area 701 including the five partial areas (330-1 to 330-5) corresponding to the light sources 410-1 to 410-5 and 411-1 and 411-5.

In FIG. 7B, the light sources 410-1 and 411-1 on the left are turned off, whereas the light sources 410-6 and 411-6 adjacent to the rightmost light sources 410-5 and 411-5, which have been turned on in the state shown in FIG. 7A, are turned on. In this case, an illuminating area 702 is an area shifted to the right by one partial area, as compared with the area 701.

In FIG. 7C, the leftmost light sources 410-2 and 411-2, which have been turned on in the state shown in FIG. 7B, are turned off, whereas the light sources 410-7 and 411-7 are turned on. In this case, an illuminating area 703 is an area shifted to the right by one partial area, as compared with the area 702.

In FIG. 7D, in the same manner, the leftmost light sources 410-3 and 411-3, which have been turned on in the state shown in FIG. 7C, are turned off, whereas the light sources 410-8 and 411-8 are turned on. In this case, an illuminating area 704 is an area shifted to the right by one partial area, as compared with the area 703.

The controller may set an opaque area wider than the area illuminated by the light sources and the light guide plate 301 by controlling the voltage applied to the first liquid crystal panel 2. In FIGS. 7A to 7D, areas 711 to 714 are set as opaque areas. This reduces unnatural images perceived during shifting of the area illuminated by the light sources and the light guide plate 301.

In another modification, the display device may include another display, such as an organic electroluminescent (EL) display to replace the second liquid crystal panel. The display device may include a stereoscopic video projector that can project a stereoscopic video to replace the second liquid crystal panel. The display device may include a stereoscopic video projector using, for example, lenticular lenses, integral photography, or holographic displays. In this case, the stereoscopic video projector may project a stereoscopic video at a position nearer a viewer than the first liquid crystal panel through the light guide plate and the first liquid crystal panel. The display device improves a sense of reality by projecting a stereoscopic video, and thus enhances visual effects further.

In the above embodiments and modifications, the display device may be mounted on a game machine, such as a pinball game machine or a reel-type game machine.

Figure 8:
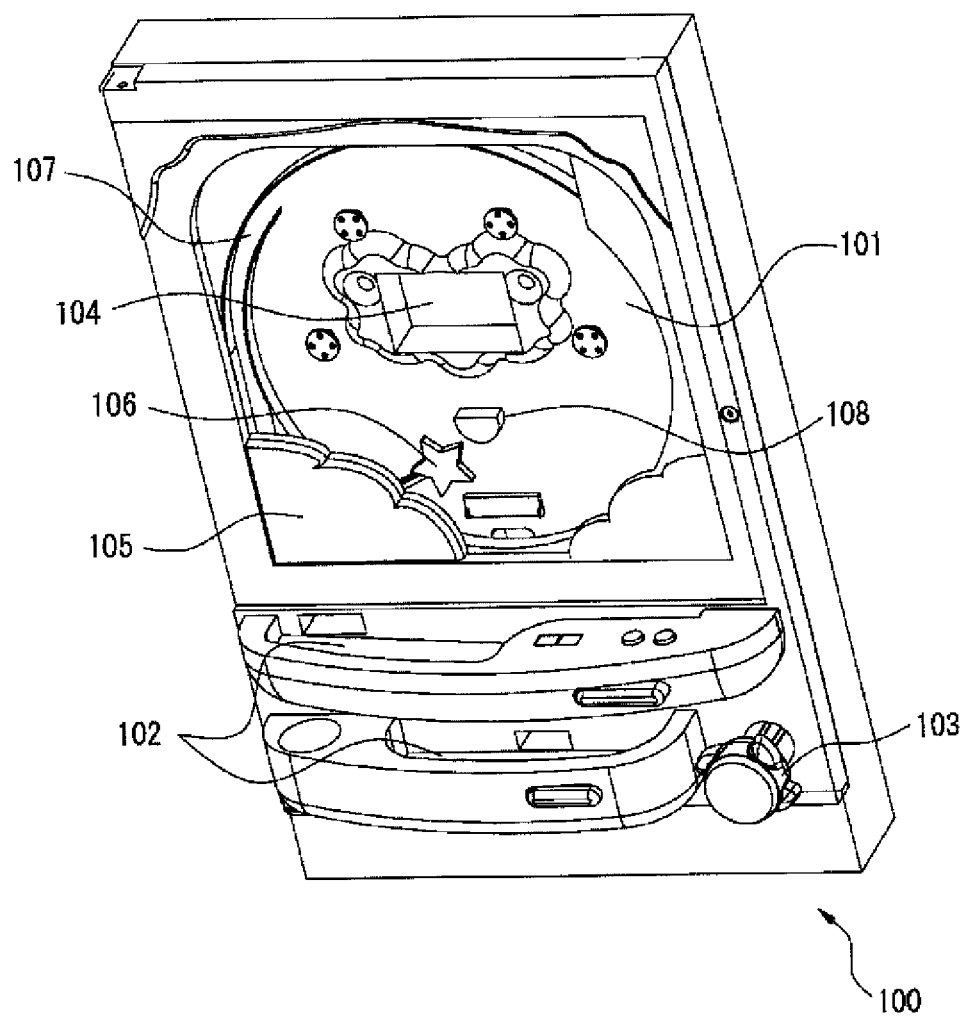
FIG. 8 is a schematic perspective view of a pinball game machine including a display device according to the embodiments or modifications as viewed from the player side.

FIG. 8 is a schematic perspective view of a pinball game machine 100 including the display device according to the above embodiments or modifications as viewed from the player (viewer) side. As shown in FIG. 8, the pinball game machine 100 includes a game board 101, which is a machine body occupying an upper and middle portion of this machine, a ball receiving tray 102, which is arranged below the game board 101, an operation unit 103 with a handle, and a display device 104 arranged substantially in the center of the game board 101.

To produce play effects, the pinball game machine 100 further includes a stationary accessory unit 105 on the front surface of the game board 101 in a lower part of the game board 101, and a movable accessory unit 106 between the game board 101 and the stationary accessory unit 105. A rail 107 is further arranged at the periphery of the game board 101. Many obstacle pins (not shown) and at least one win pocket 108 are arranged on the game board 101.

The operation unit 103 shoots a game ball from a launcher device (not shown) with a predetermined force in accordance with the degree of rotation of the handle operated by the player. Each shot game ball moves upward along the rail 107 and then falls as it passes between many obstacle pins. When a sensor (not shown) detects a ball that has fallen into any of the win pockets 108, a main control circuit (not shown) mounted on the back surface of the game board 101 dispenses a predetermined number of game balls in accordance with the win pocket 108 receiving the game ball from a ball dispenser device (not shown) onto the ball receiving tray 102. The main control circuit further drives the display device 104 with a CPU (not shown) dedicated to producing visual effects, which is mounted on the back surface of the game board 101.

The display device 104 is an example of the display device according to the above embodiments or modifications. The display device 104 is mounted on the game board 101 to have the front surface of the first liquid crystal panel facing the player. The controller of the display device 104 displays various images on the display panels of the display device 104, or turns on and off the light sources in response to control signals from the CPU for visual effects provided in accordance with the playing operation.

As described above, the embodiments may be modified variously by those skilled in the art without departing from the scope and spirit of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 1 display device
2 first liquid crystal panel
3 light guide plate
3a incident surface
3b diffusion surface
3c emission surface
31 to 34 partial area
35 to 38 prism
4-1 to 4-4 light source
5 second liquid crystal panel
6 controller
300, 301 light guide plate
408, 409, 410-1 to 410-$n$, and 411-1 to 411-$n$ light source
321, 322 prism
100 pinball slot machine
101 game board
102 ball receiving tray
103 operation unit
104 display device
105 stationary accessory unit
106 movable accessory unit
107 rail
108 win pocket

The invention claimed is:
1. A display device, comprising:
a first display panel including an image display area in which an image is displayable;
a light guide plate arranged at a back of the first display panel, the light guide plate comprising a transparent material;
a plurality of light sources respectively facing a plurality of positions on side surfaces of the light guide plate;
a second display panel that is a liquid crystal display arranged at a back of the light guide plate, the second display panel being configured to display an image viewable through the light guide plate and the first display panel; and
a controller configured to control turning on and turning off of the plurality of light sources and to control a first image displayed on the first display panel and a second image displayed on the second display panel,
wherein the light guide plate includes
an emission surface facing the first display panel,
a diffusion surface facing the second display panel, and
a plurality of prisms respectively arranged in a plurality of partial areas of the diffusion surface respectively corresponding to the plurality of light sources, and
each of the plurality of prisms is configured to illuminate a portion of the image display area of the first display panel corresponding to a corresponding one of the partial areas with light emitted from a corresponding one of the light sources and entering the light guide plate.

2. The display device according to claim 1,
wherein the plurality of partial areas are set to allow the entire display image area of the first display panel image display area to be illuminated with light from the plurality of light sources when all the plurality of light sources are turned on.

3. A game machine, comprising:
a game machine unit; and
the display device according to claim 2 arranged on a surface of the game machine unit to face a player of the game machine.

4. A game machine, comprising:
a game machine unit; and
the display device according to claim 1 arranged on a surface of the game machine unit to face a player of the game machine.

5. The display device according to claim 1, wherein the second display panel displays the second image in accordance with a signal provided from the controller.

6. A display device, comprising:
a first display panel including an image display area in which an image is displayable;
a light guide plate arranged at a back of the first display panel, the light guide plate comprising a transparent material;
a first light source facing a first side surface of the light guide plate, and a second light source facing a second side surface of the light guide plate that is perpendicular to the first side surface;
a second display panel arranged at a back of the light guide plate, the second display panel being configured to display an image viewable through the light guide plate and the first display panel; and
a controller configured to control turning on and turning off of the plurality of light sources and to control a first image displayed on the first display panel and a second image displayed on the second display panel,
wherein the light guide plate includes
an emission surface facing the first display panel,
a diffusion surface facing the second display panel, and
a plurality of first prisms, each of which has a first reflection surface that faces the first light source, and a plurality of second prisms, each of which has a reflection surface facing the second light source.

7. The display device according to claim 6, wherein the plurality of the first prisms are disposed in a first partial area of the diffusion surface, the plurality of the second prisms are disposed in a second partial area of the diffusion surface, and the first and second partial area do not overlap.

* * * * *